United States Patent
Warren

(10) Patent No.: US 9,444,232 B2
(45) Date of Patent: Sep. 13, 2016

(54) SITE GROUNDING AND BONDING SYSTEM

(71) Applicant: Centech Services Inc., Mount Vernon, AR (US)

(72) Inventor: David Warren, Mount Vernon, AR (US)

(73) Assignee: Centech Services, Inc., Mount Vernon, AR (US)

( * ) Notice: Subject to any disclaimer, the term of this patent is extended or adjusted under 35 U.S.C. 154(b) by 0 days.

(21) Appl. No.: 14/699,955

(22) Filed: Apr. 29, 2015

(65) Prior Publication Data

US 2016/0006222 A1    Jan. 7, 2016

Related U.S. Application Data

(60) Provisional application No. 62/020,912, filed on Jul. 3, 2014.

(51) Int. Cl.
*H02B 1/16*    (2006.01)
*H01R 4/66*    (2006.01)
*H02B 1/52*    (2006.01)
*H02B 3/00*    (2006.01)

(52) U.S. Cl.
CPC ...... *H02B 1/16* (2013.01); *H01R 4/66* (2013.01); *H02B 1/52* (2013.01); *H02B 3/00* (2013.01)

(58) Field of Classification Search
USPC ............................................................ 174/6
See application file for complete search history.

(56) References Cited

U.S. PATENT DOCUMENTS

| | | | |
|---|---|---|---|
| 5,808,235 A * | 9/1998 | Burton | H01R 4/66 174/6 |
| 6,744,255 B1 | 6/2004 | Steinbrecher et al. | |
| 7,173,181 B2 | 2/2007 | Park | |
| 7,365,267 B2 | 4/2008 | Kim | |
| 8,081,415 B2 | 12/2011 | Nolletti | |
| 8,272,883 B1 | 9/2012 | Smith | |
| 8,598,452 B2 | 12/2013 | Gomez et al. | |
| 8,742,254 B2 | 6/2014 | Gordin et al. | |
| 2002/0189086 A1 | 12/2002 | Yamaguchi et al. | |
| 2012/0007620 A1 | 1/2012 | Nolletti | |

\* cited by examiner

*Primary Examiner* — Dhirubhai R Patel

(57) ABSTRACT

A site grounding and bonding system provides for the grounding of a plurality of facilities at a field site using a ground box through which electrical connections are made between one or more ground devices and a distribution panel electrically connected to the facilities. The grounding devices may include one or more grounding plates and one or more ground rods buried beneath the earth. A bumper pole may be placed adjacent to the ground box and bonded to the grounding devices through the ground box. The system allows for the safe grounding of a number of facilities at a site without the necessity of placing separate grounding rods and connecting conductors for each facility.

14 Claims, 2 Drawing Sheets

SITE GROUNDING AND BONDING SYSTEM

CROSS-REFERENCE TO RELATED APPLICATIONS

This application claims priority from U.S. provisional patent application No. 62/020,912, filed on Jul. 3, 2014, and entitled "Drill Site Grounding and Bonding System." Such application is incorporated by reference in its entirety herein.

BACKGROUND

The field of the invention is grounding systems, and in particular grounding systems applicable to field sites such as hydrocarbon drilling and production sites.

The introduction of hydraulic fracturing technology, or "fracking," has led to a renaissance in new hydrocarbon production in the United States and a number of other countries. A typical drilling site utilizing hydraulic fracturing to create a production well includes a number of temporary facilities, including mobile office trailers, storm shelters, satellite trailers, generators, and distribution panels for various facilities. Electrical grounding is required for such facilities in order to maintain electrical machinery in proper working order, and to protect the safety of the workers at the site.

The requirements for grounding at a field site such as for well drilling and production are set by the National Electrical Code (the "Code"). Typically, grounding at drilling sites and other such field locations is performed to Code by the use of a grounding rod that is placed into the earth. Each separate trailer or piece of electrical equipment is grounding separately in the usual course of operations. A bare copper conductor is bonded to the ground rod and connected to each trailer or piece of equipment, thereby forming an electrical connection with the ground rod. This process of placing a ground rod and connecting it with the facility or equipment must be repeated each time for each piece of equipment when drill rigs enter and re-enter a well site, and also when work-over rig or finish crews set up their facilities and equipment on the site. The result is that a separate grounding operation must be performed for each trailer or piece of equipment each time it is placed at a site, which creates a great duplicity in effort related to the maintenance of the drill site or other field site. A more efficient method of providing grounding, while also ensuring the safe operation of equipment, the safety of personnel at the field site, and also maintaining Code compliance, is thus highly desirable.

BRIEF SUMMARY OF THE INVENTION

The present invention is directed to an apparatus and method for providing a drilling site or other field site with grounding that is distributed to multiple facilities, including for example trailers and electrical equipment. The invention provides in certain embodiments one or more grounding rods connected through a ground box by bonded conductors and in certain embodiments the use of a bonded grounding plate. The result is a single grounding system that provides grounding for multiple facilities through the ground box, while maintaining Code compliance and thus ensuring the safe grounding of equipment and the protection of workers at the site from electrical hazard.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Figure 1:
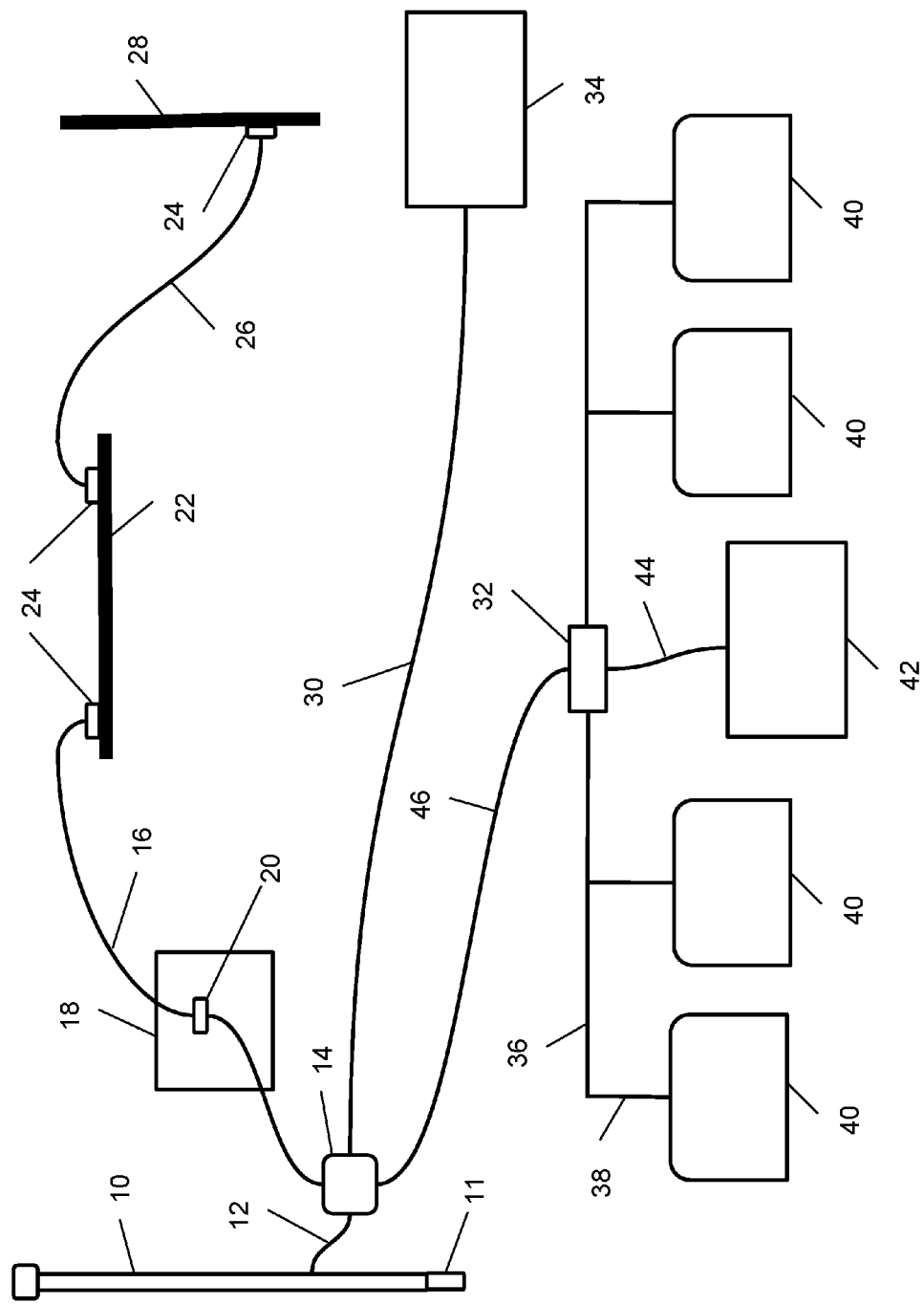
FIG. 1 is a schematic illustrating connections for one embodiment of the present invention.

With reference to FIG. 1, an embodiment of the present invention may now be described. A bumper pole 10 with a base 11 is placed into the ground such that, when installation is completed, it extends above the surface of the earth to protect ground box 14. Base 11 of bumper pole 10 may be set into the ground at a depth of 2' to 3', and may be secured in position with cement poured around base 11 while setting bumper pole 10 in place. Ground box 14 is positioned in the ground adjacent to bumper pole 10, such that the top of ground box 14 is level with the surface of the earth once installation is completed. Ground box 14 may preferably be a grounding station box such as a Quazite® enclosure box manufactured by Hubbell Incorporated. Ground box 14 is preferably at least 12" in length, width, and height in order to provide sufficient room for electrical connections within. A bumper pole conductor 12 may be bonded to bumper pole 10 and passed within ground box 14, in order to provide a grounding connection for bumper pole 10. Bumper pole conductor 12 may be formed of No. 4 bare copper wire, or larger gauge. Bumper pole conductor 12 is connected within ground box 12 to No. 3/0 copper wire, or larger gauge.

Grounding devices used in various embodiments of the invention may include, by way of example and not of limitation, one or more grounding rods or grounding plates. The various grounding devices in certain embodiments are buried such that they are at least 6' from each other in order to maintain Code compliance. In the embodiment illustrated in FIG. 1, grounding plate 18 is formed of copper and is square or rectangular in shape, being at least 24" in length and width. Grounding plate 18 is positioned in the ground at a minimum depth of 30" once installation is completed, one embodiment using a depth of about 36" beneath the earth. Grounding plate 18 is connected through ground box 14 by grounding plate conductor 16. Grounding plate conductor 16 in certain embodiments is at least No. 3/0 bare copper wire, or larger gauge, to ensure sufficiently low resistance to ground once the installation is complete. Grounding plate conductor 16 is installed by digging a trench between grounding plate conductor 16 and ground box 14 in which to place grounding plate conductor 16, which is then covered over to complete installation. Grounding plate 18 is preferably installed at least 6' from ground box 14. Grounding plate clamp 20 is used to bond grounding plate conductor 16 to grounding plate 18. Alternative means of bonding grounding plate 18 to grounding plate conductor 16 include exothermic welding. Additional grounding plates may be connected together and placed at the site as desired, or as required to ensure a sufficiently low resistance of the system for effective grounding of site facilities.

Grounding plate conductor 16 may also connect grounding plate 18 to one or more ground rods. Alternatively, a separate conductor may be used that is bonded to both grounding plate 18 and the one or more ground rods. Ground rods may be formed of copper and in certain embodiments are at least 8' in length. In the illustrated example, first ground rod 22 is connected to grounding plate 18 by grounding plate conductor 16, and second ground rod 28 is connected to first ground rod 22 by ground rod conductor 26. In this example, first ground rod 22 is placed vertically within the earth, while second ground rod 28 is buried horizontally. In alternative embodiments, any of the one or more ground rods used to ensure sufficiently low resistance for grounding of facilities may be placed horizontally, vertically, or diagonally within the earth, as desired, based upon factors such as the physical parameters of the installation site. For example, horizontal placement may be desired where a rock layer lies at a relatively shallow depth beneath the surface, thereby avoiding the additional cost of drilling through the rock layer. First ground rod 22 and second ground rod 28 may be bonded to their corresponding conductors by ground rod clamps 24, although exothermic welding or other means of providing sufficiently low-resistance electrical connection may be employed in alternative embodiments.

Connections between the grounding components of the system and the facilities to be grounded are made within ground box 14. In the illustrated example of FIG. 1, an electrical distribution panel 32 is connected to the grounding devices through ground box 14 by distribution panel conductor 46. Distribution panel conductor 46 in certain embodiments may be No. 4 or larger diesel locomotive (DLO) cable, which is connected to No. 3/0 bare copper wire, or larger gauge, within ground box 14. Distribution panel 32 is in turn connected to a number of facilities, such as mobile offices 40 and site generator 42. Distribution conductor 36, which in certain embodiments may be No. 1/0 or larger gauge wire, may be used to run the grounding connection to multiple mobile offices 40. Each mobile office 40 may then be connected to distribution conductor 36 by mobile office conductor 38, which in certain embodiments may be No. 4 or larger gauge wire. Further in the illustrated example, a site generator 42 is connected directly to distribution panel 32, rather than over distribution conductor 36, by means of bonded site generator conductor 44, which may also be in certain examples No. 1/0 or larger gauge wire. Although mobile offices 40 are used as example facilities in the illustrated embodiment, any other facilities may be connected to ground in various embodiments, either directly to distribution panel 32 or over distribution panel conductor 46, including facilities such as storm shelters and various site equipment.

In addition to attachment through distribution panel 32, various facilities may also be directly connected to the grounding devices through ground box 14. In the illustrated example, a wellhead generator 34 (or genset, i.e., combination diesel engine and electric generator) is connected through ground box 14 by means of bonded wellhead conductor 30. In certain examples, wellhead conductor 30 may be No. 3/0 or larger gauge copper wire.

Figure 2:
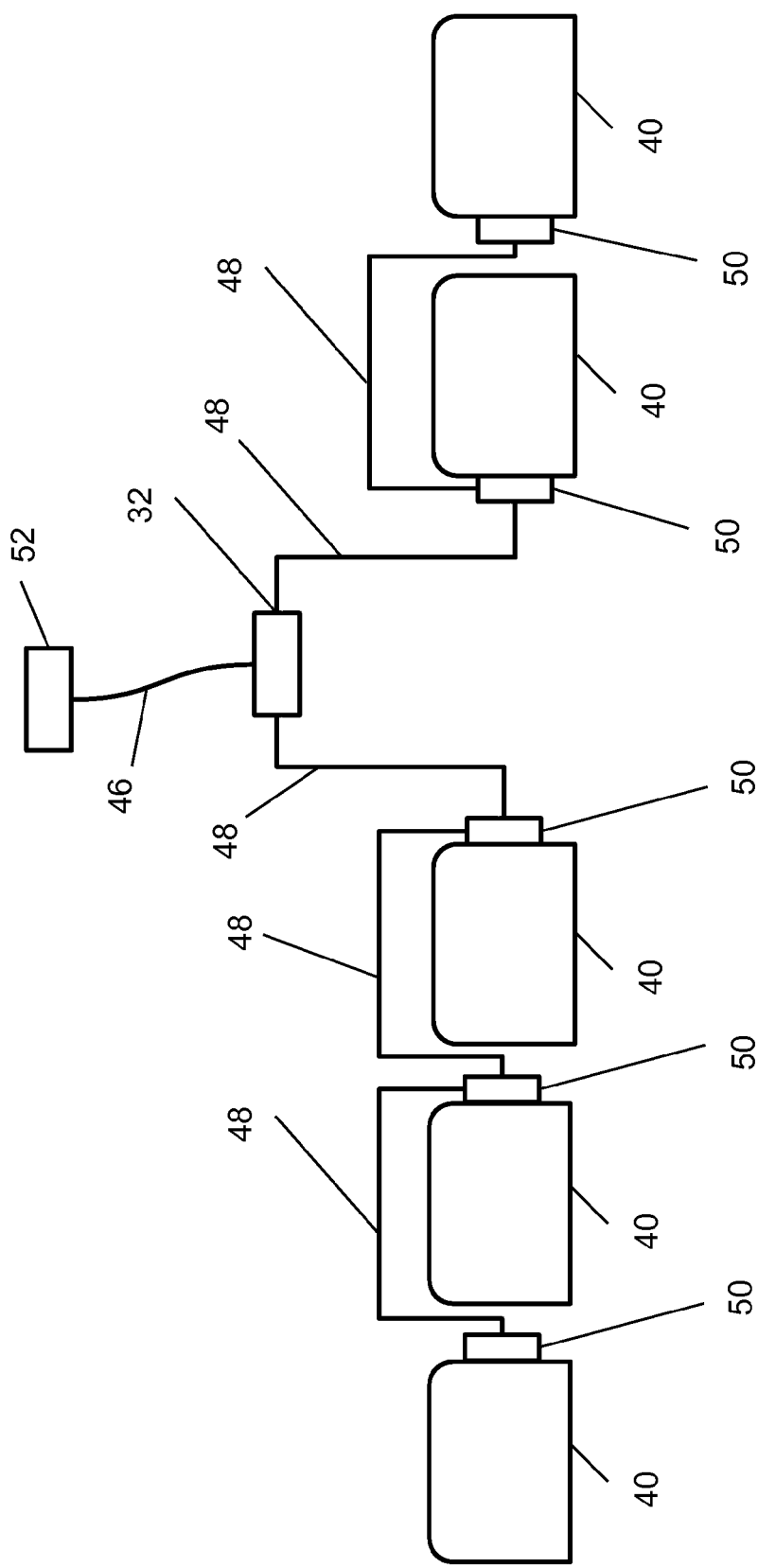
FIG. 2 is a schematic illustrating an alternative "quick connect" embodiment of the present invention.

Turning to FIG. 2, an alternative "quick connect" arrangement is illustrated. In FIG. 2, the entire grounding system, which is as described above with respect to FIG. 1, is represented by grounding system 52. No. 1/0 or larger DLO cable is used for distribution panel connector 46, which connects to distribution panel 32, as in FIG. 1. In this case, distribution panel 32 is a "gray box" mounted to a distribution transformer used to provide power to the various units at the drill site. Each mobile office 40 (which may include, for example, sleeping quarters, offices, tool shacks, and/or storm shelters) are connected in series to distribution panel 32 by quick connect cables 48. In one embodiment, each quick connect cable 48 is formed of No. 4/0 or larger DLO cable. The connection point at each mobile office 40 is tongue/frame 50. In a particular implementation, each quick connect cable 48 is approximately 125' in length. Each quick connect cable 48 is connected to tongue/frame 50 of its corresponding mobile office 40 by a crimp eye connect that is crimped onto quick connect cable 48 and then bolted to tongue/frame 50. On its opposite end, quick connect cable 48 includes a male welding lead twist lock connector, as are known in the art. At each tongue/frame 50, on the same bolt used to attach the crimp eye connect of quick connect cable 48, is one or two female welding twist lock connectors on 8" No. 4/0 DLO cable pieces, to receive the next connecting quick connect cable 48 in the series. Female welding twist lock connectors may also be used to connect quick connect cable 48 to distribution panel 32. It may be understood that in this arrangement, the addition of mobile offices 50 or the removal of mobile offices 50 from the system is easily accomplished because of the use of quick connects and the series arrangement of components, while also maintaining complete grounding protection for each component through grounding system 52.

When installation is complete in any configuration as described above, most of the components as have been described will be buried, with only bumper pole 10, the top of ground box 14, and connections with the facilities being visible. Access to ground box 14 allows for additional connections to be made with relatively little effort as facilities are added to the site or existing facilities are removed or replaced. Rather than requiring a complete re-installation each time a facility at the site is added or replaced, the permanent placement of ground box 14 allows for distributed grounding for all facilities at the site. If testing reveals that the resistance of the system is too high to provide adequate grounding, additional grounding devices, such as one or more additional grounding plates or one or more additional grounding rods, may be added to the system with relative ease. Overall system resistance should be tested at 25 Ω or less, as required by Code.

When a grouping is used herein, all individual members of the group and all combinations and subcombinations possible of the group are intended to be individually included in the disclosure. When a range is expressed herein, all values within and subsets of that range are intended to be included in the disclosure. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. In general the terms and phrases used herein have their art-recognized meaning, which can be found by reference to standard texts, journal references and contexts known to those skilled in the art. The preceding definitions are provided to clarify their specific use in the context of the invention.

The present invention has been described with reference to certain preferred and alternative embodiments that are intended to be exemplary only and not limiting to the full scope of the present invention, as set forth in the appended claims.

The invention claimed is:

1. A field site grounding apparatus, comprising:
   a. a ground box;
   b. a first grounding plate;
   c. a grounding plate conductor bonded to the first grounding plate so as to allow the flow of electrical current into the first grounding plate from the grounding plate conductor, wherein the grounding plate conductor comprises a grounding plate conductor end that passes into the ground box;
   d. a first ground rod bonded to the grounding plate conductor so as to allow the flow of electrical current into the ground rod from the grounding plate conductor;
   e. a distribution panel;
   f. a distribution panel conductor electrically connected to the distribution panel, wherein the distributor box conductor comprises a distribution panel conductor end that passes into the ground box and is bonded to the grounding plate conductor end within the ground box;
   g. a plurality of facilities electrically connected to the distribution panel;
   h. a bumper pole adjacent to the ground box, wherein the bumper pole comprises a base, wherein the bumper pole extends above a surface of the ground to protect the ground box, wherein the bumper pole base is set into the ground at a depth of two to three feet, and wherein the bumper pole base is secured in position with cement poured around the bumper pole base; and
   i. a bumper pole conductor bonded to the bumper pole wherein the bumper pole conductor comprises a bumper pole conductor end that passes into the ground box and is bonded to the grounding plate conductor end within the ground box.

2. The apparatus of claim 1, wherein the first grounding plate and the first ground rod are positioned at least six feet apart.

3. The apparatus of claim 2, further comprising:
   a. a second ground rod; and
   b. a ground rod conductor bonded to the second ground rod and electrically connecting the first ground rod and the second ground rod.

4. The apparatus of claim 3, wherein the first ground rod and the second ground rod are positioned at least six feet apart.

5. The apparatus of claim 2, wherein the first ground rod is positioned in the ground horizontally.

6. The apparatus of claim 3, wherein the second ground rod is positioned in the ground vertically.

7. The apparatus of claim 1, wherein the grounding plate is positioned at least thirty inches beneath a surface of the earth.

8. The apparatus of claim 1, further comprising a second grounding plate, wherein the grounding plate conductor is bonded to the second grounding plate so as to allow the flow of electrical current into the second grounding plate from the grounding plate conductor.

9. The apparatus of claim 8, wherein the first grounding plate and the second grounding plate are positioned at least six feet apart.

10. The apparatus of claim 1, wherein the first grounding plate comprises a length and width of at least two feet each.

11. The apparatus of claim 1, further comprising:
    a. a wellhead generator; and
    b. a wellhead conductor electrically connected to the wellhead generator, wherein the wellhead conductor comprises a wellhead conductor end that passes into the ground box and is bonded to the grounding plate conductor end within the ground box.

12. The apparatus of claim 1, further comprising:
    a. a distribution conductor electrically connected to the distribution panel; and
    b. a plurality of facility conductors, wherein each of the facility conductors comprises a first and second end, wherein each first facility conductor end is bonded to the distribution conductor, and each second facility conductor end is electrically connected to one of the plurality of facilities.

13. The apparatus of claim 12, further comprising:
    a. a site generator; and
    b. a site generator conductor electrically connected to the site generator and to the distribution panel.

14. The apparatus of claim 1, further comprising a grounding plate clamp bonding the first grounding plate to the grounding plate conductor.

* * * * *